United States Patent [19]

Reinehr et al.

[11] 4,336,214

[45] Jun. 22, 1982

[54] PROCESS FOR HYGROSCOPIC, FIBRES AND FILAMENTS OF SYNTHETIC POLYMERS

[75] Inventors: Ulrich Reinehr, Dormagen; Hermann-Josef Jungverdorben, Neukirchen; Toni Herbertz, Dormagen; Alfred Nogaj, Dormagen; Peter Kleinschmidt, Dormagen, all of Fed. Rep. of Germany

[73] Assignee: Bayer Aktiengesellschaft, Leverkusen, Fed. Rep. of Germany

[21] Appl. No.: 117,161

[22] Filed: Jan. 31, 1980

Related U.S. Application Data

[63] Continuation of Ser. No. 746,727, Dec. 2, 1976, abandoned.

[30] Foreign Application Priority Data

Dec. 2, 1975 [DE] Fed. Rep. of Germany ....... 2554124

[51] Int. Cl.3 .............................................. B29H 7/20

[52] U.S. Cl. ..................................... 264/49; 264/206; 264/211; 428/376

[58] Field of Search ................ 264/206, 49, 211, 182; 428/376

[56] References Cited

U.S. PATENT DOCUMENTS

| | | | |
|---|---|---|---|
| 2,075,888 | 4/1937 | Dreyfus | 264/211 |
| 2,376,934 | 5/1945 | Morgan | 264/78 |

FOREIGN PATENT DOCUMENTS

| | | | |
|---|---|---|---|
| 41-2733 | 2/1966 | Japan | 264/184 |
| 46-5207 | 2/1971 | Japan | 264/182 |

*Primary Examiner*—Jay H. Woo

*Attorney, Agent, or Firm*—Sprung, Horn, Kramer & Woods

[57] ABSTRACT

The invention relates to hygroscopic filaments and fibres of synthetic high polymers. The improved hygroscopicity compared with known synthetic fibres is due to the fact, that in a conventional dry-spun process a liquid is added to the spinning solvent which liquid has a higher boiling point than the spinning solvent used, which liquid is readily miscible both with the spinning solvent and water and which represents a non-solvent for the polymer to be spun.

4 Claims, 2 Drawing Figures

PROCESS FOR HYGROSCOPIC, FIBRES AND FILAMENTS OF SYNTHETIC POLYMERS

This is a continuation, of application Ser. No. 746,727, filed Dec. 2, 1976, now abandoned.

This invention relates to hygroscopic fibres and filaments of synthetic polymers and to a process for their production.

For a number of applications, for example for bed linen or underwear, it is desirable to use textiles of manmade fibres which, in their behaviour with respect to moisture, show properties similar to those of natural fibres, such as cotton. Accordingly, there have never been any shortage of attempts to improve the properties of manmade fibres which are unsatisfactory in this respect.

For example, hygroscopic natural fibres have been mixed with synthetic fibres. It is also known, for example, that polyacrylonitrile can be mixed with another acrylonitrile polymer containing from 30 to 80% by weight of a polyethylene oxide methacrylate, and that the resulting mixtures can be spun (German Patent Specification No. 16 45 532). Acrylic fibres such as these, which contain ethoxylated acrylic acid derivatives with chemically bonded polyethylene oxide, have long been known for their antistatic effect, although their moisture regain is not particularly high. Attempts have also been made to improve the hygroscopic quality by copolymerising certain monomers. According to Japanese Patent Application No. 2782/70, monomers containing a hydrophilic group, for example acrylic acid derivatives, are incorporated into the polymer, followed by hydrolysis. A specially substituted acrylamide is proposed as comonomer in German Offenlegungsschrift No. 20 61 213.

Attempts have also been made to improve the hygroscopic quality by crosslinking. German Auslegeschrift No. 23 03 893 describes the hydrolysis with sulphuric acid of wet-spun swollen acrylic fibres which contain the N-methylol compound of an unsaturated amide in copolymerised form. It is also possible by crosslinking to obtain fibres with improved moisture absorption according to U.S. Pat. No. 3,733,386 by treating the fibres with aldehyde compounds and acid.

Despite the large number of methods proposed and their diversity, however, it has not yet been possible to produce synthetic fibres with a hygroscopic quality which even remotely approaches the favourable hygroscopic properties of cotton. Cotton has a moisture regain of approximately 7% at 65% relative humidity/21° C. and a water retention capacity of approximately 45%.

Accordingly it is an object of the present invention to provide artificial filaments and fibres with improved moisture regain.

It is a further object of the invention to provide artificial filaments and fibres with improved water retention capacity.

Another object is to provide artificial filaments and fibres with improved moisture regain and water retention capacity compared with conventional synthetic fibres and filaments.

It is a preferred object of this invention to provide acrylonitrile filaments and fibres with improved moisture regain and water retention capacity compared with conventional acrylonitrile filaments and fibres.

Still another object of this invention is to provide a process for the production of such fibres and filaments.

It has now surprisingly been found that this required improvement is obtained when a liquid with specific properties is added to the solvent for the polymer in a dry spinning process.

Accordingly, the present invention is related to a process for the production of hygroscopic filaments or fibres from a filament-forming synthetic polymer by a dry spinning process, which comprises adding to the spinning solvent from 5 to 50% by weight, based on the total solvent and solids, of a liquid which (a) has a higher boiling point than the spinning solvent used;

(b) is readily miscible with the spinning solvent and with water;

(c) is a non-solvent for the polymer to be spun.

It is possible by this process to obtain filaments and fibres with a core-jacket structure which have a moisture regain of at least 2% (at 65% relative humidity/21° C.) and a water retention capacity of at least 10%.

The invention also relates to these filaments and fibres.

The polymers used for producing the filaments and fibres are preferably acrylonitrile polymers, of which it is preferred to use those of which at least 50% and most preferably at least 85% by weight consists of acrylonitrile units.

In cases where acrylonitrile polymers are used, the hygroscopic quality of the fibres may be further improved by using copolymers containing comonomers with hydrophilic amino, sulpho, hydroxyl-N-methylol or carboxyl groups. Particularly suitable compounds are, for example, acrylic acid, methacrylic acid, methallyl sulphonic acid, acrylamides and the N-methylol compounds of an unsaturated acid amide, for example, N-methylol acrylamide and N-methylol methacrylamide. Mixtures of polymers may also be used.

Suitable spinning solvents are the solvents conventionally used for dry spinning for example, dimethyl acetamide, dimethyl sulphoxide, N-methyl pyrrolidone, but preferably dimethyl formamide.

The liquid added to the spinning solvent must satisfy the following requirements: its boiling point must be higher, preferably 50° C. or more higher than that of the solvent; it must be miscible both with the solvent and also with water or with another liquid used as washing agent, preferably in any ratio, and it must be a non-solvent for the polymer used in the practical sense, in other words the polymer should only dissolve in this liquid to a very limited extent.

Liquids which satisfy these requirements are, for example, the monosubstituted and polysubstituted alkyl ethers and esters of polyhydric alcohols for example, diethylene glycol mono- or -dimethyl, -ethyl and -butyl ether, diethylene glycol, triethylene glycol, tripropylene glycol, triethylene glycol diacetate, tetraethylene glycol, tetraethylene glycol dimethyl ethyl, glycol ether acetates, for example butyl glycol acetate. It is also possible to use high boiling alcohols for example, 2-ethyl cyclohexanol, esters or ketones or even mixtures, for example of ethylene glycol acetates.

Glycerol and tetraethylene glycol are preferably used.

In addition to a single liquid, it is of course also possible to use mixtures of liquids, but it is important that the liquids used should be readily soluble in water so that they may be removed again during the after treatment of the fibres.

It is also advantageous to use liquids which do not form azeotropic mixtures with the spinning solvent used, so that they may be almost completely recovered by fractional distillation, as in the case of DMF-glycerol or DMF-diethylene glycol mixtures.

These liquids are added to the spinning solvent in quantities of from 5 to 50% by weight and preferably in quantities of from 10 to 20% by weight, based on the total solvent and solids. The upper limit to the content of miscible liquid is determined in practice by the spinnability of the polymer solution. The larger the quantity by weight of liquid added to the spinning solvent, the greater the degree of porosity in the core of the fibre and the greater the hydrophilic quality of filaments produced from spinning solution mixtures such as these.

In the case of glycerol, it is possible to add up to approximately 16% by weight to a 17% by weight polyacrylonitrile solution in DMF. In order to obtain thorough admixture of the spinning solution, it is best first to mix the spinning solvent, for example DMF, with the relatively high boiling liquid and subsequently to add the polymer powder to the thoroughly stirred solution, because the direct addition of glycerol to polyacrylonitrile solutions in DMF can give rise to precipitations.

In order to obtain fibres with as high a hygroscopic quality as possible by the process according to the invention, the spinning treatment is selected so that as little as possible of the added liquid evaporates in the spinning duct during the dry spinning process or is entrained by the evaporating spinning solvent. Extremely low spinning duct temperatures, which are only just above the boiling point of the spinning solvent to be evaporated, short spinning ducts and high spinning rates and, hence, short residence times in the spinning duct have proved to be of considerable advantage. For these reasons, the spinning duct temperature should be at most 80° C. and preferably 5° to 30° C. above the boiling temperature of the spinning solvent used.

As a result of this measure, most of the liquid added (generally 90%) remains in the silver or in the filaments. It is only removed by washing out in the course of the after treatment.

The hygroscopic quality of the fibres thus produced, which have a core-jacket structure, can be further influenced by the particular type of after treatment and the manner in which it is carried out.

If, for example, acrylic fibres of a DMF-glycerol mixture are stretched in steam or water by the spinning process according to the invention and subsequently washed, dried and after treated, even the original compact jacket surface of the fibres or filaments becomes highly microporous through glycerol diffusing out, so that acrylic fibres with a particularly high hygroscopic quality are obtained.

In the spinning of ACN polymers from DMF-glycerol mixtures with a polyacrylonitrile solids concentration of 17% by weight and a glycerin content of 15.7% by weight, it was possible for the first time, by suitably after treating the filaments spun by the process described above, to obtain acrylic fibres with a water retention capacity of more than 30% and a moisture regain of more than 5%, which is substantially equivalent to the hygroscopic quality of cotton.

However, if the core-jacket fibres are first washed and then stretched, the compact jacket structure remains intact because the glycerol is washed out before stretching and because the vacuoles formed by glycerol diffusing out are closed again by the drawing process. Acrylic fibres with a compact jacket surface and, hence, a lower hygroscopic quality are obtained (cf. Example 2).

Washing of the core-jacket fibres may be carried out at temperatures of up to 100° C. The residence time should amount to at least 10 seconds in order thoroughly to wash out the added liquid.

In connection with the washing process, it has also proved to be advantageous to keep the slivers or filaments under only slight tension or to allow them to shrink to a very limited extent only in order to maximise removal of the added liquid.

The subsequent after treatment of the slivers or filaments may be carried out by the after treatment techniques conventionally applied, such as preparation, crimping, drying and cutting, the conditions under which the fibres are dried having a further effect upon the hygroscopic quality of the fibres.

Very mild drying conditions of at most 160° C., preferably 110° to 140° C. and short residence times of at most 2 to 3 minutes in the dryer, give core-jacket fibres with a very high hygroscopic quality.

An increase in the moisture regain and water retention capacity of the core-jacket fibres according to the invention in relation to the washing-drawing process may also be obtained if the fibres or filaments, which contain only very small quantities of spinning solvent on leaving the duct, are immediately drawn, brightened, dried and after treated to form fibres by known methods (cf. Example 3).

As already mentioned, the filaments and fibres according to the invention have a core-jacket structure. In these core-jacket structures, the core is microporous, the average pore diameter amounting to at most 1$\mu$ and in general, it amounts to between about 0.5 and 1$\mu$. The surface area of the core in a cross-section through the fibre generally amounts to approximately 70% of the total cross-sectional area.

The jacket may be compact or also microporous, depending upon particular the after treatment conditions selected.

Whereas the cross-sectional form of conventional dry-spun filaments and fibres is the known dumb bell or bone form, the filaments and fibres according to the invention mainly have other cross-sectional forms. Thus, irregular, trilobal, mushroom-shaped, round and bean-shaped structures are encountered, in some cases alongside one another. Which cross-sectional form predominates is governed not only by the particular spinning conditions selected but also by the quantity of liquid added to the spinning solvent, the latter measure having the greater influence.

In addition to the hygroscopic quality described above, the filaments and fibres according to the invention show favourable fibre properties, such as high tensile strength, elongation at break and good dyeability.

Another very considerable advantage of the fibres according to the invention in regard to wearing comfort derives from their core-jacket structure. Whereas natural fibres such as cotton for example, feel wet throughout in the event of high water absorption, this is not the case with the fibres according to the invention. It is assumed that this is attributable to the fact that the water absorbed diffuses into the microporous core. As a result, the fibres do not feel wet outside, which in practice provides for a dry comfortable feel.

Although the description has thus far largely been confined to acrylic fibres and their production, the present invention is by no means limited to the production of acrylic fibres. Linear, aromatic polyamides, for example the polyamide of m-phenylene diamine and isophthalyl chloride, or those of the type which optionally contain heterocyclic ring systems, for example polybenzimidazoles, oxazoles, thiazoles etc. and which may be produced by a dry spinning process, may also be used in accordance with the present invention.

Other suitable compounds are polymers with melting points above 300° C. which in general can no longer be spun from the melt and are produced by a solution spinning process, for example by dry spinning.

The water-retention capacity of fibres is an important parameter so far as their use for clothing purposes is concerned. The effect of a high water retention capacity is that textiles worn next to the skin are able to keep the skin relatively dry in the event of heavy perspiration, thereby improving wearing comfort.

Determining Water Retention Capacity (WR)

The water retention capacity is determined in accordance with DIN 53814 (cf. Melliand Textilberichte 4 1973, page 350).

The fibre samples are immersed for 2 hours in water which contains 0.1% of wetting agent. Thereafter the fibres are centrifuged for 10 minutes with an acceleration of 10,000 m/sec$^2$ and the quantity of water which is retained in and between the fibres is gravimetrically determined. In order to determine their dry weight, the fibres are dried at 105° C. until they have a constant moisture content. The water retention capacity (WR) in percent by weight is:

$$WR = \frac{m_f - m_{tr}}{m_{tr}} \times 100$$

mf=weight of the moist fibres $m_{tr}$=weight of the dry fibres.

Determining Moisture Regain (MR)

The moisture regain of the fibres based on their dry weight is gravimetrically determined. To this end, the samples are exposed for 24 hours to a climate of 21° C./65% relative air humidity. In order to determine their dry weight the samples are dried at 105° C. until constant in weight. The moisture regain (MR) in percent by weight is:

$$MR = \frac{m_f - m_{tr}}{m_{tr}} \times 100$$

mf=moist weight of the fibres at 21° C./65% relative humidity $m_{tr}$=dry weight of the fibres.

Figure 1:
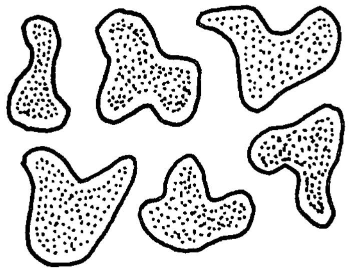
FIG. 1 is a photograph taken with an optical microscope of the cross-section of a sliver according to Example 1 (magnified 320 times).

The invention is further illustrated but not intended to be limited by the following Examples, in which the parts and percentages quoted relate to weight, unless otherwise stated.

EXAMPLE 1

19.9 kg of DMF were mixed while stirring with 4.8 kg of glycerol in a vessel. Thereafter 5.1 kg of an acrylonitrile copolymer of 93.6% of acrylonitrile, 5.7% of methyl acrylate and 0.7% of sodium methallyl sulphonate were added while stirring. The resulting mixture was stirred for 1 hour at 80° C., filtered and the completed spinning solution dry spun from a 180 bore spinneret in a spinning duct by methods known in the art.

The duct temperature was 160° C. The viscosity of the spinning solution, which had a solids concentration of 17% and a glycerol content of 15.7% by weight, based on DMF+polymer powder, amounted to 85 ball drop seconds. For determining viscosity by the ball drop method, see K. Jost, Rheologica Acta, Vol. 1, No. 2–3 (1958), page 303. The spun material with a denier of 1700 dtex was collected on bobbins and then doubled into a sliver with an overall denier of 102,000 dtex. After leaving the spinning duct, the sliver still contained 14.1% by weight of glycerol.

The glycerol content of the sliver was determined by gas chromatographic analysis. The tow was then drawn in a ratio of 1:3.6 in boiling water, washed for 3 minutes under slight tension in boiling water and provided with antistatic preparation. This was followed by drying in a screen drum dryer at a maximum temperature of 130° C. with a permitted shrinkage of 20% after which the tow was cut into fibres with a staple length of 60 mm.

The individual fibres with a final denier of 3.3 dtex have a moisture regain of 5.2% and a water retention capacity of 32.8%. Tensile strength=2.6 p/dtex; elongation at break 41%.

After leaving the spinning duct, the fibres have a marked core-jacket structure coupled with irregular, generally trilobal cross-sectional forms, as shown by the photograph taken with an optical microscope of the cross-sections in FIG. 1 (magnified 320 times).

The jacket surface has a useful width of approximately 4 μm. In order to determine the core and jacket area of the fibres, more than 100 fibres cross-sections were evaluated by quantitative analysis with a Leitz "Classimat" image analyser. On average 32% of the cross-sectional area was occupied by the useful width of the jacket.

Figure 2:
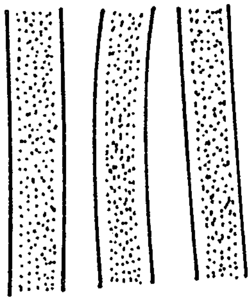
FIG. 2 is a photograph taken with an optical microscope of the longitudinal section of fibres according to Example 1 (magnified 320 times).

FIG. 2 is a photograph taken with an optical microscope of three filaments (magnified 320 times). In this case, too, the core-jacket structure with a more compact jacket and a fine-pored core is clearly visible.

The residual solvent content of the fibres was less than 0.2% by weight whilst the residual glycerol content amounted to 0.6% by weight. The fibres can be dyed deeply throughout with a blue dye corresponding to the formula

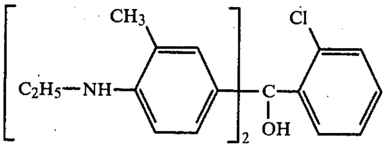

The extinction value amounted to 1.39 for 100 mg of fibre per 100 ml of DMF (570 mμ, 1 cm cuvette).

Yarns with a count of 36/1 were spun from the fibres with a final denier of 3.3 dtex, and made up into pieces of knitting. The pieces, some of which were left white and others dyed blue, were found to have a moisture regain of 5.1% and a water retention capacity of 34.3%.

EXAMPLE 2

An acrylonitrile copolymer with the same chemical composition as that used in Example 1 was dissolved under the same conditions in a DMF-glycerol mixture, followed by filtration and spinning. The spun material was collected on bobbins and doubled into a sliver with an overall denier of 102,000 dtex.

The material was then washed under tension for 3 minutes in boiling water, drawn in a ratio of 1:3.6, provided with antistatic preparation and aftertreated in the same way as described in Example 1.

The fibres with an individual denier of 3.3 dtex had a moisture regain of 2.0%. The water retention capacity amounted to 11.4%. The fibres again have a pronounced core-jacket structure and an irregular, generally trilobal cross-section.

In contrast to the fibres of Example 1, the jacket surface was more compact and was not permeated by vacuoles. This is explained by the poorer hygroscopic quality of the fibres in comparison with Example 1. Due to the modified aftertreatment process, the vacuoles formed through removal of the glycerol during washing are to an extent closed again by the drawing process carried out after washing.

EXAMPLE 3

An acrylonitrile copolymer with the same chemical composition as that used in Example 1 was dry spun under the same conditions from a DMF-glycerol mixture. The sliver with a denier of 102,000 dtex was subjected directly, i.e. without washing, to drawing in a ratio of 1:3.6 in boiling water, followed by preparation, crimping, drying at 120° C. in a screen drum dryer with 20% permitted shrinkage and finally by cutting into staple fibres.

The fibres with a final denier of 3.3 dtex had a moisture regain of 2.9% and a water retention capacity of 24.5%. Fibre cross-section: core-jacket structure with a trilobal cross-section.

EXAMPLE 4

10.0 kg of DMF were mixed while stirring with 2.15 kg of glycerol in a vessel. Thereafter 2.85 kg of an acrylonitrile copolymer of 91.1% of acrylonitrile, 5.5% of methyl acrylate and 3.4% of sodium methallyl sulphonate were added while stirring, the mixture was stirred for 1 hour at 80° C., filtered and the finished spinning solution was spun in the same way as described in Example 1.

The spinning solution, which had a solids concentration of 19% by weight and a glycerol content of 14.5% by weight, based on DMF and PAN solids, had a viscosity of 78 ball drop seconds.

The spun material with a denier of 1710 dtex was doubled into a tow and aftertreated in the same way as described in Example 1. The individual fibres, with a final denier of 3.3 dtex, had a moisture regain of 5.8% and a water retention capacity of 35.3%.

The fibres again have an irregular to trilobal cross-section and show a pronounced core-jacket structure. The improvement in the hygroscopic quality in relation to Example 1 is explained by the increased presence of acid groups in the copolymer.

EXAMPLE 5

10.4 kg of DMF were mixed while stirring with 2.15 kg of glycerol in a vessel. Thereafter 2.85 kg of an acrylonitrile copolymer of 90% of acrylonitrile, 5% of acrylamide and 5% of N-methoxy-methyl acryl amide were added while stirring, the mixture was stirred for 1 hour at 80° C., filtered and the completed spinning solution spun in the same way as described in Example 1.

The spinning solution, which had a solids content of 15% by weight for a glycerol content of 14.5% by weight, based on DMF and PAN solids, has a viscosity of 69 ball drop seconds.

The spun material, with a denier of 1700 dtex was again doubled into a tow and aftertreated in the same way as described in Example 1.

The individual fibres with a final denier of 3.2 dtex had a moisture regain of 5.3% and a water retention capacity of 34.9%.

The fibres again have an irregular, generally trilobal cross-section with a pronounced core-jacket structure. The improved hygroscopic quality in comparison with Example 1 is explained by the presence of the hydrophilic amino and N-methoxy methyl acryl amide groups in the copolymer.

EXAMPLE 6

16.1 kg of DMF were mixed while stirring with 3.4 kg of glycerol in a vessel. 2.0 kg of an acrylonitrile copolymer of 91.1% of acrylonitrile, 5.5% of methyl acrylate and 3.4% of sodium methallyl sulphonate, and 2.0 kg of an acrylonitrile copolymer of 90% of acrylonitrile, 5% of acryl amide and 5% of N-methoxy methyl acryl amide were then added while stirring.

After stirring for 1 hour at 80° C. and filtering, the completed spinning solution was spun in the same way as described in Example 1 and the spun material was subsequently aftertreated. The glycerol content, based on the DMF-PAN mixture, amounted to 14.5% by weight.

The spinning solution, which had a solids content of 17% by weight, had a viscosity of 68 ball drop seconds.

The individual fibres, with a final denier of 3.3 dtex had a moisture regain of 5.7% and a water retention capacity of 31%.

The fibres again had a pronounced core-jacket structure with a generally trilobal cross-section.

EXAMPLE 7

8.6 kg of DMF were mixed while stirring with 2.17 kg of glycerol in a vessel. 4.2 kg of an acrylonitrile copolymer of 59% of acrylonitrile, 37.5% of vinylidene chloride and 3.5% of sodium methallyl sulphonate were then added while stirring.

After stirring for 1 hour at 50° C., the filtered solution which contained 14.5% by weight of glycerol, based on DMF and PAN solids was dry spun and aftertreated in the same way as described in Example 1.

The spinning solution had a viscosity of 53 ball drop seconds.

The fibres with a final denier of 3.3 dtex had a pronounced core-jacket structure with predominantly round cross-sections and a porous core.

The moisture regain amounted to 2.0% and the water retention capacity to 38%.

EXAMPLE 8

16.5 kg of DMF were mixed while stirring with 3.5 kg of diethylene glycol in a vessel. 6.0 kg of an acrylonitrile copolymer with the same chemical composition as that used in Example 1 were then added while stirring, followed by dry spinning in the same way as described in Example 1. The spun material was aftertreated to form fibres.

The spinning solution, which contained 13.5% by weight of diethylene glycol, based on DMF and PAN solids, had a viscosity of 65 ball drop seconds.

The fibres with a final denier of 3.3 dtex again showed a pronounced core-jacket structure with a trilobal cross-section. The moisture regain amounted to 4.3% and the water retention capacity to 27.4%.

EXAMPLE 9 (Comparison)

(a) 13.1 kg of DMF are mixed while stirring with 4.9 kg of ethylene carbonate in a vessel. 6.0 kg of an acrylonitrile copolymer with the same chemical composition as that used in Example 1 were then added while stirring.

The ethylene carbonate content amounted to 20.5% by weight, based on the DMF and PAN mixture, for a solids concentration of 25% by weight. After stirring for 1 hour at 80° C., the solution was filtered, dry spun and the spun materials aftertreated to form fibres in the same way as described in Example 1.

The fibres with a final denier of 3.3 dtex showed the usual dumb-bell cross-section. There was no evidence of a core-jacket structure.

The moisture regain amounted to 1.3% and the water retention capacity to 5.5%.

Despite the large addition of ethylene carbonate, no change was detected in the cross-sectional structure nor was there any increase in hygroscopic quality in relation to standard commercial-grade acrylic fibres.

Unlike glycerol and the other liquids mentioned, ethylene carbonate is a solvent for acrylonitrile polymers. No core-jacket fibres were formed.

(b) If the ethylene carbonate content of a polyacrylonitrile spinning solution with DMF is reduced to 5% by weight or if the ethylene carbonate content is increased to 40% by weight, fibres without a core-jacket structure are always obtained.

(c) Mixtures of DMF and y-butyrolactone, which also represent a solvent for polyacrylonitrile, behave in the same way.

What we claim is:

1. A process for the production of a hygroscopic filament or fiber having a microporous core-jacket structure, a moisture regain of at least 2 percent at 65 percent relative humidity/21° C. and a water retention capacity of at least 10 percent; consisting essentially of the steps of (1) dry-spinning a filament-forming synthetic acrylonitrile polymer containing at least 50% by weight of acrylonitrile units, a solvent therefor, and 5 to 50 percent by weight, based on the solvent and solids, of a non-solvent liquid which
   (a) has a higher boiling point than the solvent used,
   (b) is readily miscible both with the solvent and with water, and
   (c) is a non-solvent for the synthetic polymer to be spun;

under such conditions that during spinning the solvent is evaporated from the filaments in the spinning duct; but as little as possible of the non-solvent liquid evaporates in the spinning duct; and (2) removing said liquid non-solvent for the acrylonitrile polymer from said filament or fiber by washing it out during the course of the aftertreatment;

wherein said solvent is dimethyl acetamide, dimethyl sulphoxide, N-methyl pyrrolidone or dimethyl formamide.

2. The process of claim 1 in which said filament or fiber is drawn before step (2) of washing the liquid non-solvent for the synthetic polymer from said filament or fiber.

3. A process according to claim 1, wherein said non-solvent is glycerol.

4. A process according to claim 1, wherein said non-solvent is diethylene glycol.

* * * * *